(12) United States Patent
Ohsugi et al.

(10) Patent No.: US 11,979,059 B2
(45) Date of Patent: May 7, 2024

(54) LAMINATED CORE AND ELECTRIC MOTOR

(71) Applicant: NIPPON STEEL CORPORATION, Tokyo (JP)

(72) Inventors: Yasuo Ohsugi, Tokyo (JP); Ryu Hirayama, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 427 days.

(21) Appl. No.: 17/299,886

(22) PCT Filed: Dec. 17, 2019

(86) PCT No.: PCT/JP2019/049282
§ 371 (c)(1),
(2) Date: Jun. 4, 2021

(87) PCT Pub. No.: WO2020/129935
PCT Pub. Date: Jun. 25, 2020

(65) Prior Publication Data
US 2022/0094218 A1  Mar. 24, 2022

(30) Foreign Application Priority Data

Dec. 17, 2018  (JP) .................... 2018-235861

(51) Int. Cl.
*H02K 1/18*       (2006.01)
*C09J 133/08*    (2006.01)
(Continued)

(52) U.S. Cl.
CPC ............ *H02K 1/185* (2013.01); *C09J 133/08* (2013.01); *H02K 1/12* (2013.01); *H02K 1/146* (2013.01); *H02K 1/18* (2013.01)

(58) Field of Classification Search
CPC .......... H02K 1/146; H02K 1/185; H02K 1/18; H02K 2201/09; H02K 1/00; H02K 1/14;
(Continued)

(56) References Cited

U.S. PATENT DOCUMENTS 3,386,058 A   5/1968  Michel
4,025,379 A   5/1977  Whetstone
(Continued)

FOREIGN PATENT DOCUMENTS

CN   102792556 A   11/2012
EP     3553799 A1   10/2019
(Continued)

OTHER PUBLICATIONS

Japanese Industrial Standard (JIS) C 2552: 2014, relevance discussed in specification.
(Continued)

*Primary Examiner* — Alexander A Singh
(74) *Attorney, Agent, or Firm* — Renner, Otto, Boisselle & Sklar, LLP

(57) ABSTRACT

A laminated core includes a plurality of electrical steel sheets stacked in a thickness direction, each of the electrical steel sheets includes an annular core back part; a plurality of fastening parts are provided in the core back part at intervals in a circumferential direction; an adhesion region is formed on an outer circumferential side from the fastening parts in the core back part; and a non-adhesion region is formed on an inner circumferential side from the fastening parts in the core back part.

9 Claims, 5 Drawing Sheets

(51) Int. Cl.
  *H02K 1/12* (2006.01)
  *H02K 1/14* (2006.01)
(58) Field of Classification Search
  CPC ............ H02K 1/16; H02K 1/12; H02K 15/02; H02K 15/022; H02K 1/02; C09J 133/08
  USPC .................................... 310/216.065, 216.001
  See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 8,015,691 | B2 | 9/2011 | Miyake |
| 8,581,468 | B2 | 11/2013 | Kudose et al. |
| 8,697,811 | B2 | 4/2014 | Kishi et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1* | 8/2009 | Miyake ................ H02K 15/022 310/216.058 |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 | 4/2015 | Blocher et al. |
| 2015/0130318 | A1 | 5/2015 | Kitada et al. |
| 2015/0256037 | A1* | 9/2015 | Kudose .................... H02K 3/30 310/45 |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2018/0030292 | A1 | 2/2018 | Gotou |
| 2018/0056629 | A1* | 3/2018 | Hamamura .......... H02K 15/024 |
| 2018/0159389 | A1 | 6/2018 | Nishikawa |
| 2018/0212482 | A1 | 7/2018 | Nigo |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |

(56) References Cited

FOREIGN PATENT DOCUMENTS

| | | |
|---|---|---|
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
MatWeb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
Datasheet of Nylon 6, Cast (Year: N/A, Printed Jun. 28, 2023).

* cited by examiner

LAMINATED CORE AND ELECTRIC MOTOR

TECHNICAL FIELD

The present invention relates to a laminated core and an electric motor.

Priority is claimed on Japanese Patent Application No. 2018-235861, filed Dec. 17, 2018, the content of which is incorporated herein by reference.

BACKGROUND ART

In the related art, a laminated core as described in Patent Document 1 below is known. In this laminated core, electrical steel sheets adjacent in a stacking direction are adhered to each other by an adhesion layer.

CITATION LIST

Patent Document

[Patent Document 1]
Japanese Unexamined Patent Application, First Publication No. 2015-142453

SUMMARY OF THE INVENTION

Problems to be Solved by the Invention

There is room for improvement in the magnetic properties of the laminated core of the related art.

The present invention has been made in view of the above circumstances, and an object of the present invention is to improve the magnetic properties.

Means for Solving the Problem

To solve the above problems, the present invention proposes the following means.

(1) A first aspect of the present invention is a laminated core that includes a plurality of electrical steel sheets stacked in a thickness direction, wherein each of the electrical steel sheets includes an annular core back part; an adhesion region is formed on an outer circumferential side of the core back part; a non-adhesion region is formed on an inner circumferential side of the core back part; and a plurality of fastening parts are provided in the non-adhesion region of the core back part at intervals in a circumferential direction.

In general, an adhesive shrinks during curing. Therefore, when an adhesive is provided in an electrical steel sheet, a compressive stress is applied to the electrical steel sheet as the adhesive cures. When a compressive stress is applied, a strain occurs in the electrical steel sheet. Further, when fastening parts are provided on the electrical steel sheet, the electrical steel sheet is deformed, and thus a strain occurs in the electrical steel sheet. The fastening parts and the adhesion region form a fixing part. The fixing part fixes electrical steel sheets adjacent in the stacking direction to each other. As the area of the fixing part increases, the strain of the electrical steel sheet increases.

According to this configuration, the adhesion region in which the adhesion part that is, for example, an adhesive is provided is formed on only the outer circumferential side of the core back part. Therefore, the core back parts of the electrical steel sheets adjacent in the stacking direction are partially adhered to each other. Therefore, the area of the adhesion region formed in the core back part is reduced as compared with, for example, a case in which the adhesion region extends inward in the radial direction to the fastening part. Therefore, the area of the fixing part in a plan view in the stacking direction is reduced. Accordingly, the strain that occurs in the entire laminated core can be made smaller. As a result, the iron loss that is generated in the laminated core can be reduced, and the magnetic properties of the laminated core can be improved.

(2) In the laminated core according to (1), the outer circumferential side of the core back part may be an outside of outer circumferential edges of the fastening parts; and the inner circumferential side of the core back part may be an inside of the outer circumferential edges of the fastening parts.

According to this configuration, a portion of the adhesion region nearest the inner circumference does not overlap the fastening parts at all. Therefore, it is possible to avoid further application of a strain due to the fixation of the adhesion part being provided in the region where the strain occurs in the electrical steel sheet by fixing the stacking direction with the fastening parts. Therefore, the area of the fixing part is further reduced. Accordingly, the strain that occurs in the laminated core can be made smaller.

(3) In the laminated core according to (2), the outer circumferential side of the core back parts may be an outside of a virtual circle formed on an outer circumferential side of the outer circumferential edges of the fastening parts; and the inner circumferential side of the core back part may be an inside of the virtual circle.

According to this configuration, for example, even in a case in which the electrical steel sheet includes tooth parts, the adhesion region is not provided in the tooth parts. Therefore, the area of the fixing part is further reduced. Accordingly, the strain that occurs in the laminated core can be made smaller.

(4) In the laminated core according to any one of claims (1) to (3), the adhesion regions may be formed at least in the vicinity of the fastening parts in the outer circumferential edge of the core back part.

According to this configuration, the adhesion parts are provided discontinuously (intermittently) at intervals without being continuously provided over the entire circumference of the outer edge of the core back part. Therefore, the area of the adhesion regions formed in the core back part is reduced as compared with, for example, a case in which the adhesion regions are formed over the entire circumference. Accordingly, the area of the fixing part is further reduced. Therefore, the strain that occurs in the entire laminated core can be made smaller.

(5) The laminated core according to any one of claims (1) to (4) may further include an adhesion part which is provided in the adhesion region of the core back part between the electrical steel sheets adjacent in the stacking direction and adheres the core back parts adjacent in the stacking direction to each other.

According to this configuration, it is possible to reliably adhere the electrical steel sheets adjacent in the stacking direction to each other using the adhesion part.

(6) In the laminated core according to (5), an average thickness of the adhesion parts may be 1.0 μm to 3.0 μm.

(7) In the laminated core according to (5) or (6), an average tensile modulus of elasticity E of the adhesion parts may be 1500 MPa to 4500 MPa.

(8) In the laminated core according to any one of (5) to (7), the adhesion part may be a room temperature adhesion type acrylic-based adhesive including SGA made of an elastomer-containing acrylic-based adhesive.

(9) A second aspect of the present invention is an electric motor including the laminated core according to any one of (1) to (8).

According to this configuration, it is possible to improve the magnetic properties of the electric motor.

Effects of the Invention

According to the present invention, it is possible to improve the magnetic properties.

EMBODIMENT(S) FOR IMPLEMENTING THE INVENTION

Hereinafter, a laminated core and an electric motor according to an embodiment of the present invention will be described with reference to the drawings.

In the present embodiment, a motor, specifically, an AC motor will be described as an example of the electric motor. The AC motor is more specifically a synchronous motor, and further more specifically a permanent magnetic electric motor. This type of motor is suitably employed for, for example, an electric vehicle and the like.

Figure 1:
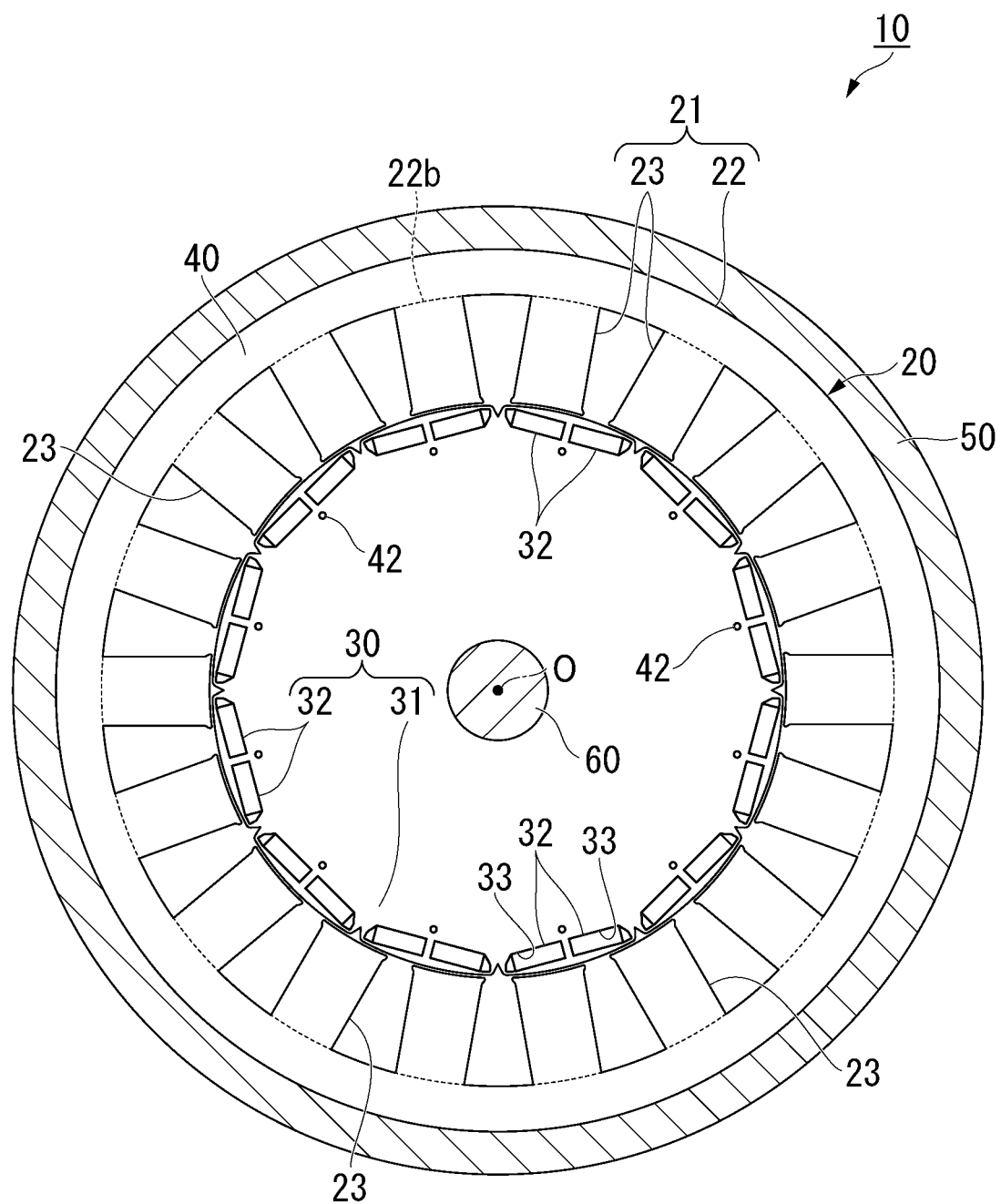
FIG. 1 is a cross-sectional view of an electric motor according to an embodiment of the present invention.
Figure 2:
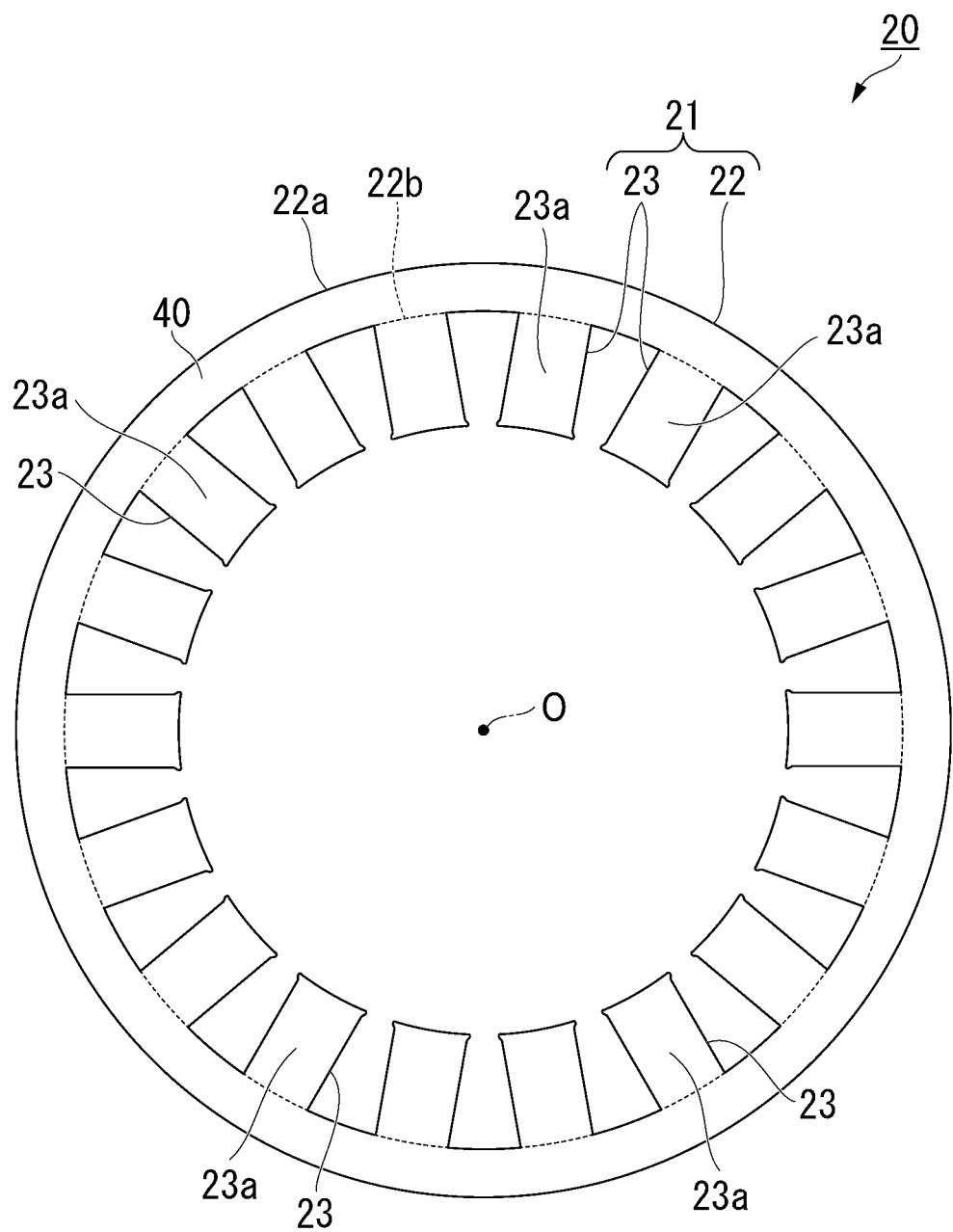
FIG. 2 is a plan view of a stator included in the electric motor shown in FIG. 1.

As shown in FIGS. 1 and 2, an electric motor 10 includes a stator 20, a rotor 30, a case 50, and a rotary shaft 60. The stator 20 and the rotor 30 are housed in the case 50. The stator 20 is fixed to the case 50.

In the present embodiment, as the electric motor 10, an inner rotor type electric motor in which the rotor 30 is located inside the stator 20 is used. However, as the electric motor 10, an outer rotor type electric motor in which the rotor 30 is located outside the stator 20 may be used. Further, in the present embodiment, the electric motor 10 is a three-phase AC motor with twelve poles and eighteen slots. However, for example, the number of poles, the number of slots, the number of phases, and the like can be appropriately changed.

The stator 20 includes a stator core 21 and a winding (not shown).

The stator core 21 includes an annular core back part 22 and a plurality of tooth parts 23. The core back part 22 is a region surrounded by an outer circumferential edge 22a of the core back part and an inner circumferential edge 22b (a broken line shown in FIG. 2) of the core back part. Hereinafter, an axial direction of the stator core 21 (the core back part 22) (a direction of the central axis O of the stator core 21) is referred to as an axial direction. A radial direction of the stator core 21 (the core back part 22) (a direction orthogonal to the central axis O of the stator core 21) is referred to as a radial direction. A circumferential direction of the stator core 21 (the core back part 22) (a direction of rotation around the central axis O of the stator core 21) is referred to as a circumferential direction.

The core back part 22 is formed in a circular shape in a plan view of the stator 20 in the axial direction.

The plurality of tooth parts 23 protrude from the core back part 22 in the radial direction (toward the central axis O of the core back part 22 in the radial direction). The plurality of tooth parts 23 are disposed at equal intervals in the circumferential direction. In the present embodiment, eighteen tooth parts 23 are provided every 20 degrees in terms of a central angle centered on the central axis O. The plurality of tooth parts 23 are formed to have the same shape and the same size.

The winding is wound around the tooth parts 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is disposed coaxially with the stator 20 to form an annular shape (a circular shape). The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 form one magnetic pole. A plurality of sets of the permanent magnets 32 are disposed at equal intervals in the circumferential direction. In the present embodiment, twelve sets (twenty four in total) of the permanent magnets 32 are provided every 30 degrees in terms of a central angle centered on the central axis O.

In the present embodiment, as the permanent magnetic electric motor, an interior permanent magnet motor is employed.

In the rotor core 31, a plurality of through holes 33 that penetrate the rotor core 31 in the axial direction are formed. The plurality of through holes 33 are provided corresponding to the plurality of permanent magnets 32. Each permanent magnet 32 is fixed to the rotor core 31 in a state of being disposed in the corresponding through hole 33. For example, an outer surface of the permanent magnet 32 and an inner surface of the through hole 33 are adhered to each other by an adhesive, and thus each permanent magnet 32 is fixed to the rotor core 31. As the permanent magnetic electric motor, a surface permanent magnet motor may be used instead of the interior permanent magnet motor.

Each of the stator core 21 and the rotor core 31 is a laminated core. The laminated core is formed by a plurality of electrical steel sheets 40 being stacked.

The stacking thickness of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on a tip end of each of the tooth parts 23 of the stator core 21. The inner diameter of the stator core 21 is a diameter of a virtual circle inscribed in the tip ends of all of the tooth parts 23.

Each electrical steel sheet 40 for forming the stator core 21 and the rotor core 31 is formed, for example, by a process of punching an electrical steel sheet as a base material. A known electrical steel sheet can be used as the electrical steel sheet 40. The chemical composition of the electrical steel sheet 40 is not particularly limited. In the present embodiment, as the electrical steel sheet 40, a non-grain-oriented electrical steel sheet is employed. As the non-grain-oriented electrical steel sheet, for example, a non-grain-oriented electrical steel strip of Japanese Industrial Standards (JIS) C 2552: 2014 can be employed.

However, as the electrical steel sheet 40, a grain-oriented electrical steel sheet can also be employed instead of a non-grain-oriented electrical steel sheet. As the grain-oriented electrical steel sheet, a JIS C 2553: 2012 grain-oriented electrical steel strip can be employed.

An insulation coating is provided on each of both surfaces of the electrical steel sheet 40 to improve the workability of the electrical steel sheet and to reduce the iron loss of the laminated core. As the substance constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, and the like. Examples of the organic resin include epoxy-based resins, acrylic-based resins, acrylic-styrene-based resins, polyester-based resins, silicone-based resins, fluorine-based resins, and the like.

To ensure the insulation performance between the electrical steel sheets 40 stacked on each other, the thickness of the insulation coating (the thickness per one surface of the electrical steel sheet 40) is preferably 0.1 μm or more.

On the other hand, as the insulation coating becomes thicker, the insulation effect becomes saturated. Further, as the insulation coating becomes thicker, the space factor decreases, and a performance for serving as the laminated core deteriorates. Therefore, it is preferable to form the insulation coating as thin as possible in a range in which the insulation performance can be ensured. The thickness of the insulation coating (the thickness per one surface of the electrical steel sheet 40) is preferably 0.1 μm or more and 5 μm or less, and more preferably 0.1 μm or more and 2 μm or less.

As the electrical steel sheet 40 becomes thinner, the effect of reducing the iron loss gradually becomes saturated. Further, as the electrical steel sheet 40 becomes thinner, the manufacturing cost of the electrical steel sheet 40 increases. Therefore, in consideration of the effect of reducing the iron loss and the manufacturing cost, the thickness of the electrical steel sheet 40 is preferably 0.10 mm or more.

On the other hand, if the electrical steel sheet 40 is too thick, a press punching operation of the electrical steel sheet 40 becomes difficult.

Therefore, in consideration of the press punching operation of the electrical steel sheet 40, the thickness of the electrical steel sheet 40 is preferably 0.65 mm or less.

Further, as the electrical steel sheet 40 becomes thicker, the iron loss increases. Therefore, in consideration of the iron loss characteristics of the electrical steel sheet 40, the thickness of the electrical steel sheet 40 is preferably 0.35 mm or less. The thickness of the electrical steel sheet 40 is more preferably 0.20 mm or 0.25 mm.

In consideration of the above points, the thickness of each electrical steel sheet 40 is, for example, 0.10 mm or more and 0.65 mm or less. The thickness of each electrical steel sheet 40 is preferably 0.10 mm or more and 0.35 mm or less, and more preferably 0.20 mm or 0.25 mm. The thickness of the electrical steel sheet 40 also includes the thickness of the insulation coating.

Figure 3:
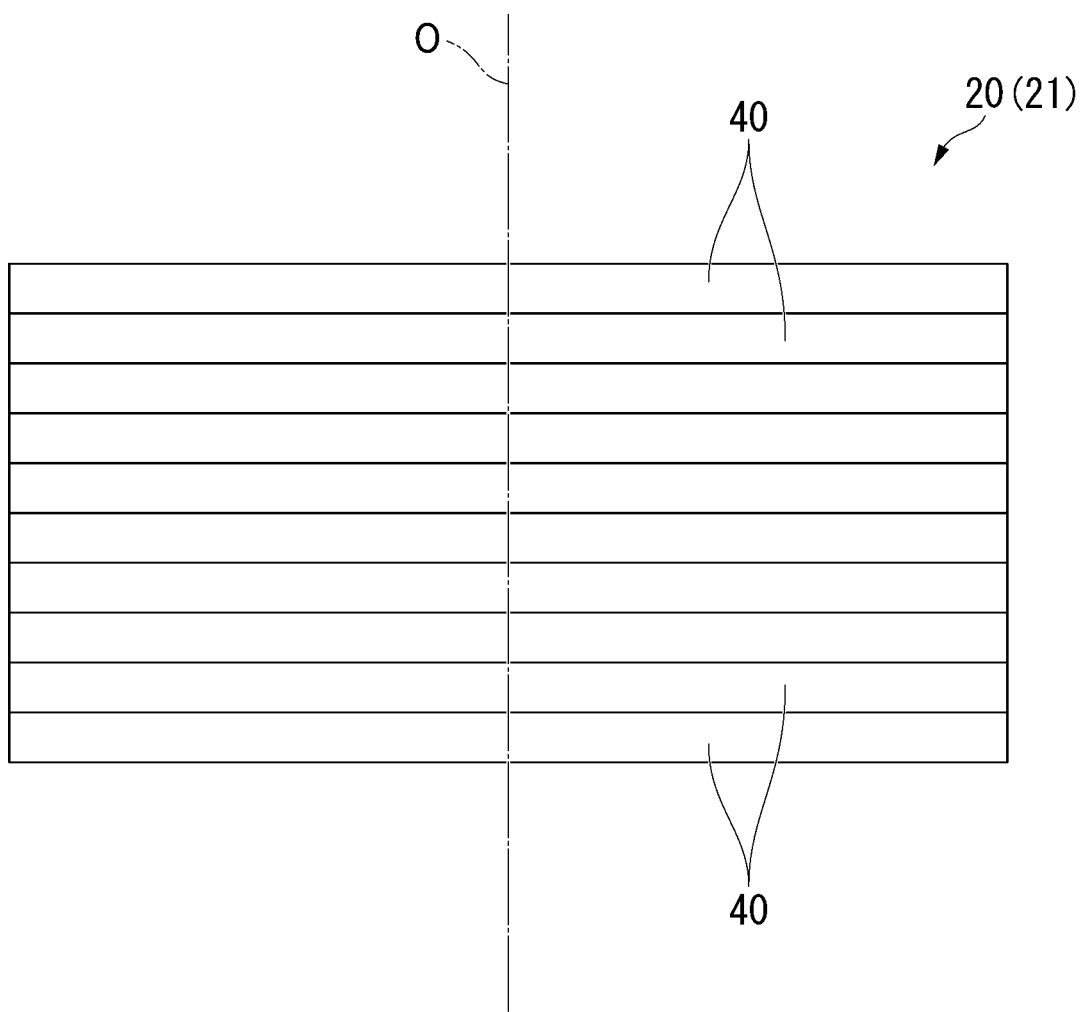
FIG. 3 is a side view of a laminated core according to an embodiment of the present invention.

As shown in FIG. 3, the plurality of electrical steel sheets 40 for forming the stator core 21 are stacked in a thickness direction. The thickness direction is a thickness direction of the electrical steel sheet 40. The thickness direction corresponds to a stacking direction of the electrical steel sheets 40. The plurality of electrical steel sheets 40 are disposed coaxially with the central axis O. The electrical steel sheet 40 includes the core back part 22 and the plurality of tooth parts 23.

Figure 4:
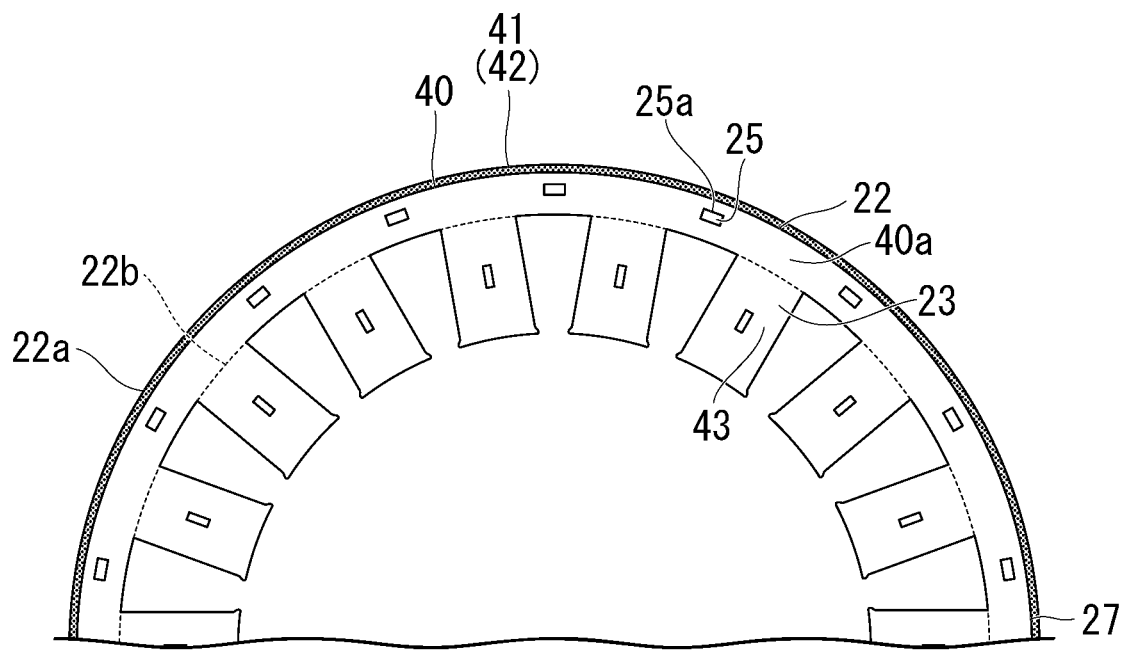
FIG. 4 is a plan view of a first surface of an electrical steel sheet in the laminated core according to the embodiment of the present invention.

As shown in FIG. 4, the plurality of electrical steel sheets 40 for forming the stator core 21 are fixed to each other by an adhesion part 41 and fastening parts 25 which are provided on a surface (a first surface) 40*a* of the electrical steel sheet 40. For example, although not shown, the fastening part 25 is constituted by a convex part (a dowel) and a concave part which are formed in the electrical steel sheet 40. The convex part protrudes from the electrical steel sheet 40 in the stacking direction. The concave part is disposed in a portion of the electrical steel sheet 40 which is located on a back side of the convex part. The concave part is recessed in the stacking direction with respect to the surface of the electrical steel sheet 40. The convex part and the concave part are formed, for example, by a process of pressing the electrical steel sheet 40.

Out of a pair of electrical steel sheets 40 overlapping in the stacking direction, the convex part of the fastening part 25 of one electrical steel sheet 40 fits into the concave part of the fastening part 25 of the other electrical steel sheet 40.

The adhesion part 41 adheres the core back parts 22 (the electrical steel sheets 40) adjacent in the stacking direction to each other. The plurality of electrical steel sheets 40 for forming the stator core 21 are adhered to each other by the adhesion part 41.

The adhesion part 41 is an adhesive that is provided between the electrical steel sheets 40 adjacent in the stacking direction and has cured without being divided. As the adhesive, for example, a thermosetting type adhesive by polymer bonding and the like is used.

As a composition of the adhesive, (1) an acrylic-based resin, (2) an epoxy-based resin, (3) a composition containing an acrylic-based resin and an epoxy-based resin, and the like can be applied.

As the adhesive, in addition to the thermosetting type adhesive, a radical polymerization type adhesive and the like can also be used. From the viewpoint of productivity, a room temperature curing type (a room temperature adhesion type) adhesive is desirable. The room temperature curing type adhesive is an adhesive that cures at 20° C. to 30° C. In addition, in the present specification, a value range represented using "to" means a range including values before and after "to" as a lower limit value and an upper limit value.

As the room temperature curing type adhesive, an acrylic-based adhesive is preferable. Typical acrylic-based adhesives include a second generation acrylic-based adhesive (SGA) and the like. Any one of an anaerobic adhesive, an instant adhesive, and an elastomer-containing acrylic-based adhesive can be used as long as the effects of the present invention are not impaired.

The adhesive referred to here refers to an adhesive in a state before curing. After the adhesive cures, it becomes the adhesion part 41.

An average tensile modulus of elasticity E of the adhesion parts 41 at room temperature (20° C. to 30° C.) is in the range of 1500 MPa to 4500 MPa. If the average tensile modulus of elasticity E of the adhesion parts 41 is less than 1500 MPa, a problem that the rigidity of the laminated core is lowered occurs. Therefore, a lower limit of the average tensile modulus of elasticity E of the adhesion parts 41 is 1500 MPa, and more preferably 1800 MPa. On the contrary, if the average tensile modulus of elasticity E of the adhesion parts 41 exceeds 4500 MPa, a problem that the insulation coating formed on the surface of the electrical steel sheet 40 is peeled off occurs. Therefore, an upper limit of the average tensile modulus of elasticity E of the adhesion parts 41 is 4500 MPa, and more preferably 3650 MPa.

The average tensile modulus of elasticity E is measured by a resonance method. Specifically, a tensile modulus of elasticity is measured in conformity with JIS R 1602: 1995.

More specifically, first, a sample for measurement (not shown) is made. This sample is obtained by adhering two electrical steel sheets 40 to each other by the adhesive to be measured and curing the adhesive to form the adhesion part 41. In a case in which the adhesive is a thermosetting type adhesive, this curing is performed by heating and pressurizing under heating and pressurizing conditions in actual operation. On the other hand, in a case in which the adhesive is a room temperature curing type adhesive, the curing is performed by pressurizing at room temperature.

Then, the tensile modulus of elasticity of this sample is measured by a resonance method. As described above, a method of measuring a tensile modulus of elasticity by the resonance method is performed in conformity with JIS R 1602: 1995. After that, the tensile modulus of elasticity of the adhesion part 41 alone is obtained by removing the influence of the electrical steel sheet 40 itself from the tensile modulus of elasticity (the measured value) of the sample by calculation.

The tensile modulus of elasticity thus obtained from the sample is equal to an average value for the stator core 21 as a whole, which is a laminated core. Therefore, this value is regarded as the average tensile modulus of elasticity E. The composition of the average tensile modulus of elasticity E is set such that the average tensile modulus of elasticity E is hardly changed depending on a stacking position in the stacking direction and a circumferential position around the central axis of the stator core 21. Therefore, a value obtained by measuring the tensile modulus of elasticity of the cured adhesion part 41 at an upper end position in the stator core 21 can be regarded as the average tensile modulus of elasticity E.

As an adhesion method using a thermosetting type adhesive, for example, a method of applying an adhesive to the electrical steel sheets 40, and then adhering the electrical steel sheets 40 to each other by either one or both of heating and press-stacking can be employed.

As a heating means, for example, a method of heating in a high temperature bath or an electric furnace, a method of directly energizing, or the like is used. The heating means may be any means.

To obtain stable and sufficient adhesion strength, the thickness of the adhesion part 41 is preferably 1 µm or more.

On the other hand, when the thickness of the adhesion part 41 exceeds 100 µm, an adhesion force becomes saturated. Further, as the adhesion part 41 becomes thicker, the space factor decreases, and the magnetic properties of the laminated core in the iron loss and the like deteriorates.

Therefore, the thickness of the adhesion part 41 is 1 µm or more and 100 µm or less. The thickness of the adhesion part 41 is more preferably 1 µm or more and 10 µm or less.

In the above, the thickness of the adhesion part 41 means an average thickness of the adhesion parts 41.

The average thickness of the adhesion parts 41 is more preferably 1.0 µm or more and 3.0 µm or less. If the average thickness of the adhesion parts 41 is less than 1.0 µm, a sufficient adhesion force cannot be secured as described above. Therefore, a lower limit of the average thickness of the adhesion parts 41 is 1.0 µm, and more preferably 1.2 µm. On the contrary, if the average thickness of the adhesion parts 41 becomes thicker than 3.0 µm, problems such as a large increase in a strain amount of the electrical steel sheet 40 due to shrinkage during thermosetting occur. Therefore, an upper limit of the average thickness of the adhesion parts 41 is 3.0 µm, and more preferably 2.6 µm.

The average thickness of the adhesion parts 41 is an average value for the stator core 21 as a whole. The average thickness of the adhesion parts 41 is hardly changed depending on a stacking position in the stacking direction and a circumferential position around the central axis of the stator core 21. Therefore, an average value of values obtained by measuring the thicknesses of the adhesion parts 41 at the upper end position in the stator core 21 at ten or more points in the circumferential direction can be regarded as the average thickness of the adhesion parts 41.

The average thickness of the adhesion parts 41 can be adjusted, for example, by changing the application amount of the adhesive. Further, for example, in a case of a thermosetting type adhesive, the average tensile modulus of elasticity E of the adhesion parts 41 can be adjusted by changing either one or both of heating and pressurizing conditions applied at the time of adhesion and the type of a curing agent.

In the present embodiment, the plurality of electrical steel sheets 40 for forming the rotor core 31 are fixed to each other by a fastening part 42 (a dowel, see FIG. 1).

However, the plurality of electrical steel sheets 40 for forming the rotor core 31 may be adhered to each other by the adhesion part 41.

The laminated core such as the stator core 21 and the rotor core 31 may be formed by so-called the turn-stacking.

As shown in FIG. 4, a plurality of the fastening parts 25 are provided in the core back part 22 of the electrical steel sheet 40 at intervals in the circumferential direction. As will be described later, the plurality of fastening parts 25 are each provided on a non-adhesion region 43. The plurality of fastening parts 25 are disposed on the same circle centered on the central axis O. Each fastening part 25 is shifted with respect to each of the tooth parts 23 in the circumferential direction.

On a surface of the electrical steel sheet 40 which faces in the stacking direction (hereinafter referred to as a first surface of the electrical steel sheet 40) 40a, an adhesion region 42 of the electrical steel sheet 40 in which the adhesion part 41 is provided and the non-adhesion region 43 of the electrical steel sheet 40 in which the adhesion part 41 is not provided are formed. More specifically, the adhesion region 42 of the electrical steel sheet 40 in which the adhesion part 41 is provided means a region of the first surface 40a of the electrical steel sheet 40 in which the adhesive (the adhesion part 41) that has cured without being divided is provided. Further, the non-adhesion region 43 of the electrical steel sheet 40 in which the adhesion part 41 is not provided means a region of the first surface 40a of the electrical steel sheet 40 in which the adhesive that has cured without being divided is not provided.

The adhesion region 42 and the non-adhesion region 43 are different regions from each other and do not overlap each other.

In the present embodiment, the adhesion region 42 is formed on an outer circumferential side of the core back part 22 of the first surface 40a of the electrical steel sheet 40. In other words, the adhesion part 41 is provided on the outer circumferential side of the core back part 22 of the first surface 40a of the electrical steel sheet 40. Further, in other words, the adhesive is applied to the outer circumferential side of the core back part 22 of the first surface 40a of the electrical steel sheet 40.

The outer circumferential side of the core back part 22 is preferably an outside of outer circumferential edges 25a of the fastening parts 25 (the outer circumferential edges 25a of the fastening parts 25 mean portions of the fastening parts 25 which are located on the outermost side of the fastening parts 25 in the radial direction).

Further, the outer circumferential side of the core back parts 22 is more preferably an outside of a virtual circle 27 formed on an outer circumferential side of the outer circumferential edges 25a of the fastening parts 25. The virtual circle 27 can have the same diameter as a virtual circumscribed circle that is circumscribed about the plurality of fastening parts 25.

In FIG. 4, the adhesion part 41 is continuously provided over the entire circumference of an outer edge of the core back part 22 on the outside of the virtual circle 27 formed on the outer circumferential side of the outer circumferential edges 25a of the fastening parts 25.

In other words, in FIG. 4, the adhesion region 42 is continuously formed over the entire circumference of an outer edge of the core back part 22 on the outside of the virtual circle 27 formed on the outer circumferential side of the outer circumferential edges 25a of the fastening parts 25.

As shown in FIG. 4, the adhesion part 41 is not provided on an inner circumferential side of the core back part 22 of the first surface 40a of the electrical steel sheet 40. In other words, the adhesive is not applied to the inner circumferential side of the core back part 22 of the first surface 40a of the electrical steel sheet 40. Further, in other words, the non-adhesion region 43 is formed on the inner circumferential side of the core back part 22 of the first surface 40a of the electrical steel sheet 40. The plurality of fastening parts 25 are provided in the non-adhesion region 43 at intervals in the circumferential direction.

Further, the inner circumferential side of the core back part 22 is preferably an inside of the outer circumferential edges 25a of the fastening parts 25. Further, the inner circumferential side of the core back part 22 is more preferably an inside of a virtual circle 27 formed on an outer circumferential side of the outer circumferential edges 25a of the fastening parts 25. In other words, a portion of the core back part 22 which is located inside the circumscribed circle in the radial direction is preferably the non-adhesion region 43. In FIG. 4, the non-adhesion region 43 is provided over the entire inside region of the virtual circle 27 formed on the outer circumferential side of the outer circumferential edges 25a of the fastening parts 25 in the core back part 22.

The non-adhesion region 43 is also provided in a portion of the first surface 40a of the electrical steel sheet 40 corresponding to each of the plurality of tooth parts 23.

The outside of the outer circumferential edges 25a of the fastening parts 25 refers to a region of the core back part 22 outside the outer circumferential edges 25a of the fastening parts 25. The inside of the outer circumferential edges 25a of the fastening parts 25 refers to a region of the core back part 22 inside the outer circumferential edges 25a of the fastening parts 25 and a region of the core back part 22 along the outer circumferential edges 25a of the fastening parts 25. Similarly, the outside of the virtual circle 27 refers to a region of the core back part 22 outside the virtual circle 27. Similarly, the inside of the virtual circle 27 refers to a region of the core back part 22 inside the virtual circle 27 and a region of the core back part 22 along the virtual circle 27.

It is assumed that the adhesion part 41 is provided between all of the sets of the electrical steel sheets 40 adjacent in the stacking direction as shown in FIG. 4. In this case, the ratio of an area of the adhesion region 42 to 100% of an area of the core back part 22 of the first surface 40a of the electrical steel sheet 40 is, for example, 20%.

Figure 5:
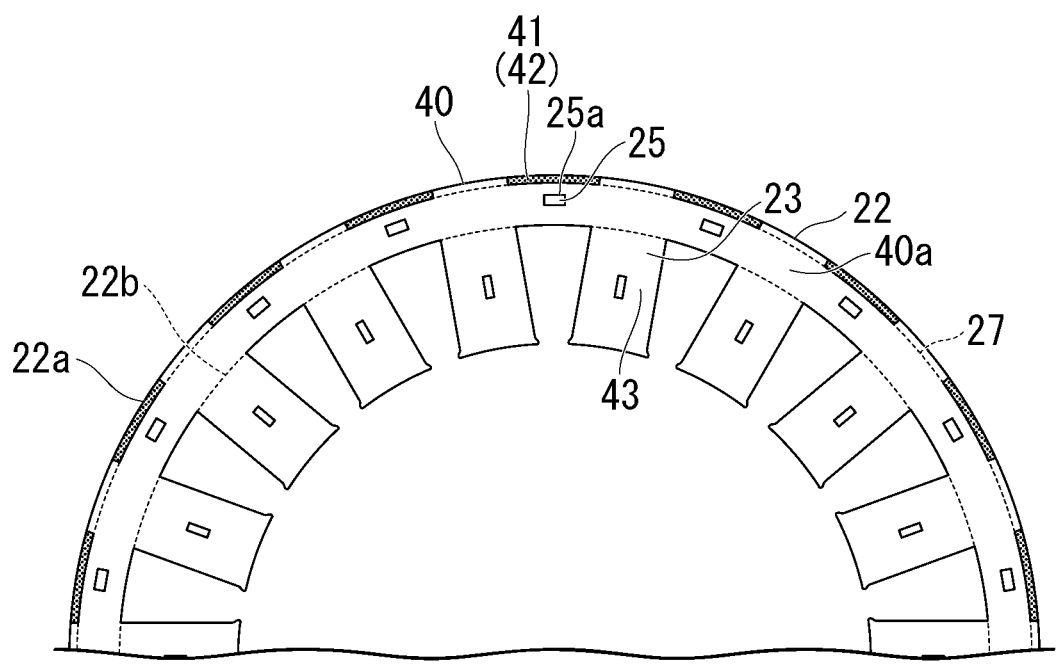
FIG. 5 is a plan view of a first surface of an electrical steel sheet in a laminated core according to an embodiment of the present invention.

Further, as shown in FIG. 5, the adhesion parts 41 may be provided on the outer circumferential side of the core back part 22 of the first surface 40a of the electrical steel sheet 40 and at least in the vicinity of the fastening parts 25 of the outer edge of the core back part 22. The term "the vicinity of the fastening parts 25" as used herein means, for example, a range of three times the length of each of the fastening parts 25 in the circumferential direction with each of the fastening parts 25 as the center in the circumferential direction.

In an example shown in FIG. 5, the adhesion parts 41 are intermittently provided over the entire circumference. The adhesion parts 41 are provided only in the vicinity of the fastening parts 25 in the outer edge of the core back part 22. In other words, the adhesion parts 41 are also shifted with respect to the tooth parts 23 in the circumferential direction, as in the fastening parts 25. The adhesion parts 41 are not provided in portions of the outer edge of the core back part 22 which are located on an outside of the tooth parts 23 in the radial direction. In other words, instead of the adhesion regions 42, the non-adhesion regions 43 are formed in portions of the outer edge of the core back part 22 which are located on an outside of the tooth parts 23 in the radial direction.

The size of each of the adhesion regions 42 in the circumferential direction is larger than the size of each of the fastening parts 25 in the circumferential direction. Each of the fastening parts 25 is disposed in a central portion of each of the adhesion regions 42 in the circumferential direction. The size of each of the adhesion regions 42 in the circumferential direction is larger than the interval between the adhesion regions 42 adjacent in the circumferential direction.

A case in which the adhesion parts 41 are provided between all of the sets of the electrical steel sheets 40 adjacent in the stacking direction as shown in FIG. 5 will be described. In this case, the ratio of an area of the adhesion regions 42 to 100% of an area of the core back part 22 of the first surface 40a of the electrical steel sheet 40 is, for example, 12%.

In the present embodiment, it is assumed that the non-adhesion regions 43 are formed in the plurality of tooth parts 23 included in the electrical steel sheet 40. In this case, the plurality of fastening parts 25 may be provided in the non-adhesion region 43 of the core back part 22 and the non-adhesion regions 43 of the plurality of tooth parts 23 at intervals in the circumferential direction.

In general, an adhesive shrinks during curing. Therefore, when the adhesive is provided in the electrical steel sheet, a compressive stress is applied to the electrical steel sheet as the adhesive cures. When a compressive stress is applied, a strain occurs in the electrical steel sheet. Further, when the fastening parts are provided on the electrical steel sheet, the electrical steel sheet is deformed, and thus a strain occurs in the electrical steel sheet. The fastening parts and the adhesion region form a fixing part. The fixing part fixes the electrical steel sheets adjacent in the stacking direction to each other. As the area of the fixing part increases, the strain of the electrical steel sheet increases.

As described above, in the stator core 21 (the laminated core) according to the present embodiment, the plurality of fastening parts 25 are provided in the core back part 22 at intervals in the circumferential direction. The adhesion parts 41 are provided on the outer circumferential side of the core back part 22 of the first surface 40*a* of the electrical steel sheet 40. The adhesion parts 41 are not provided on the inner circumferential side of the core back part 22 of the first surface 40*a* of the electrical steel sheet 40.

In other words, in the stator core 21 (the laminated core) according to the present embodiment, the plurality of fastening parts 25 are provided in the core back part 22 at intervals in the circumferential direction. The adhesion regions 42 are formed on the outer circumferential side of the core back part 22 of the first surface 40*a* of the electrical steel sheet 40. The non-adhesion regions 43 are formed on the inner circumferential side of the core back part 22 of the first surface 40*a* of the electrical steel sheet 40.

With this configuration, the adhesion regions 42 in which the adhesion parts 41 are provided are formed on only the outer circumferential side of the core back part 22. The core back parts 22 of the electrical steel sheets 40 adjacent in the stacking direction are partially adhered to each other. Therefore, the area of the adhesion regions formed in the core back part 22 is reduced as compared with, for example, a case in which the adhesion regions extend inward in the radial direction to the fastening part. Therefore, the area of the fixing part in a plan view in the stacking direction is reduced. Accordingly, the strain that occurs in the entire stator core 21 can be made smaller. As a result, the iron loss that is generated in the stator core 21 can be reduced, and the magnetic properties of the stator core 21 can be improved.

The fastening parts 25 are provided in the non-adhesion regions 43 different from the adhesion regions 42.

If it is attempted to manufacture a stator core in which the fastening parts are provided in the adhesion regions, the following problems occur. For example, to provide the fastening parts in the adhesion regions, an adhesive is applied to the convex parts of the fastening parts of the electrical steel sheet. If it is attempted to fit the convex parts coated with the adhesive into the concave parts of the fastening parts of another electrical steel sheet, the adhesive gets in between the convex parts and the concave parts, and the convex parts may not fit deep into the concave part. In this case, there is a problem that the convex parts and the concave parts do not fit accurately and the pair of electrical steel sheets are not stacked in parallel to each other.

A similar problem occurs also in a case in which the adhesive is applied to the concave parts of the fastening parts of the electrical steel sheet.

On the other hand, in the stator core 21 of the present embodiment, the fastening parts 25 are provided in the non-adhesion regions 43. Therefore, the adhesive does not get in between the convex parts and the concave parts, and even if the fastening parts 25 are provided on the electrical steel sheet 40, the electrical steel sheets 40 adjacent in the stacking direction can be stacked in parallel to each other.

In the stator core 21 of the present embodiment, the adhesion regions 42 are formed on the outer circumferential side of the core back part 22. Therefore, in addition to a method in which the adhesive is applied to the first surface 40*a* of the electrical steel sheet 40 to provide the adhesion parts 41, it is possible to provide the adhesion parts by the following method.

That is, the adhesive is disposed outside the plurality of stacked electrical steel sheets 40 in the radial direction. When the pressure of the air inside the plurality of electrical steel sheets 40 in the radial direction is reduced, the adhesive is impregnated between the plurality of electrical steel sheets 40. It is possible to provide the adhesion parts by curing this adhesive.

In the stator core 21 (the laminated core) according to the present embodiment, the outer circumferential side of the fastening parts 25 in the core back part 22 is set to the outside of the outer circumferential edges 25*a* of the fastening parts 25. Then, the inner circumferential side of the fastening parts 25 in the core back part 22 is set to the inside of the outer circumferential edges 25*a* of the fastening parts 25.

With this configuration, a portion of the adhesion regions 42 nearest the inner circumference does not overlap with the fastening parts 25 at all. Therefore, it is possible to avoid further application of a strain due to the fixation of the adhesion part 41 being provided in the region where the strain occurs in the electrical steel sheet 40 by fixing the stacking direction with the fastening parts 25. Therefore, the area of the fixing part is further reduced. Accordingly, the strain that occurs in the entire stator core 21 can be made smaller.

In the stator core 21 (the laminated core) according to the present embodiment, the outer circumferential side of the core back part 22 is set to the outside of the virtual circle 27 formed on the outer circumferential side of the outer circumferential edges 25*a* of the fastening parts 25. Then, the inner circumferential side of the core back part 22 is set to the inside of the virtual circle 27 formed on the outer circumferential side of the outer circumferential edges 25*a* of the fastening parts 25.

With this configuration, the adhesion regions 42 are not provided in the tooth parts 23. Therefore, the area of the fixing part that fixes the electrical steel sheets 40 adjacent in the stacking direction and is constituted by the fastening parts 25 and the adhesion parts 41 (the adhesion regions 42) is further reduced. Accordingly, the strain that occurs in the entire stator core 21 can be made smaller.

In the stator core 21 (the laminated core) according to the present embodiment, the adhesion parts 41 are provided at least in the vicinity of the fastening parts 25 in the outer edge of the core back part 22.

Accordingly, the adhesion parts 41 are provided discontinuously (intermittently) at intervals without being continuously provided over the entire circumference of the outer edge of the core back part 22. Therefore, the area of the adhesion regions 42 formed in the core back part 22 is reduced as compared with, for example, a case in which the adhesion regions are formed over the entire circumference of the core back part. Accordingly, the area of the fixing part is further reduced. Therefore, the strain that occurs in the entire stator core 21 can be made smaller.

The stator core 21 (the laminated core) according to the present embodiment includes the adhesion parts 41 provided in the adhesion regions 42 of the core back part 22. Therefore, it is possible to reliably adhere the electrical steel sheets 40 adjacent in the stacking direction to each other using the adhesion parts 41.

In the stator core 21 (the laminated core) according to the present embodiment, the electrical steel sheet 40 includes the plurality of tooth parts 23 in which the non-adhesion regions 43 are formed. Accordingly, the area of the non-adhesion regions 43 in the electrical steel sheet 40 increases. Therefore, it is possible to increase a region where a strain does not occur in the stator core 21.

The electric motor 10 according to the present embodiment includes the stator core 21 (the laminated core) according to the present embodiment. Therefore, it is possible to improve the magnetic properties of the electric motor 10.

The technical scope of the present invention is not limited to the above-described embodiments, and various modifications can be made without departing from the gist of the present invention.

The shape of the stator core is not limited to the forms shown in the above-described embodiments. Specifically, the dimensions of the outer diameter and the inner diameter of the stator core, the stacking thickness, the number of the slots, the dimensional ratio of each of the tooth parts in the circumferential direction and the radial direction, the dimensional ratio between each of the tooth parts and the core back part in the radial direction, and the like can be arbitrarily designed according to the properties of the desired electric motor.

In the rotor of the above-described embodiments, a set of two permanent magnets 32 form one magnetic pole, but the present invention is not limited to this. For example, one permanent magnet 32 may form one magnetic pole, or three or more permanent magnets 32 may form one magnetic pole.

In the above-described embodiments, the permanent magnetic electric motor has been described as an example of the electric motor, but the structure of the electric motor is not limited to this as will be illustrated below. As the structure of the electric motor, various known structures that will not be illustrated below can also be employed.

In the above-described embodiments, the permanent magnetic electric motor has been described as an example of the synchronous motor. However, the present invention is not limited to this. For example, the electric motor may be a reluctance motor or an electromagnet field motor (a wound-field motor).

In the above-described embodiments, the synchronous motor has been described as an example of the AC motor. However, the present invention is not limited to this. For example, the electric motor may be an induction motor.

In the above-described embodiments, the AC motor has been described as an example of the motor. However, the present invention is not limited to this. For example, the electric motor may be a DC motor.

In the above-described embodiments, the motor has been described as an example of the electric motor. However, the present invention is not limited to this. For example, the electric motor may be an electric generator.

In the above-described embodiments, the case in which the laminated core according to the present invention is applied to the stator core has been illustrated. The laminated core according to the present invention can also be applied to the rotor core.

In addition, it is possible to appropriately replace the configuration elements in the above-described embodiments with well-known configuration elements without departing from the gist of the present invention. Further, the above-described modification examples may be appropriately combined.

EXAMPLES

Hereinafter, the present invention will be described more specifically with examples and a comparative example, but the present invention is not limited to the following examples.

Example 1

As shown in FIG. 4, the adhesion part 41 was provided on the outer circumferential side of the core back part 22 of the first surface 40a of the electrical steel sheet 40. The plurality of electrical steel sheets 40 configured in this way were stacked to form the laminated core.

The ratio of an area of the adhesion region 42 to 100% of an area of the core back part 22 of the first surface 40a of the electrical steel sheet 40 was 20%.

Two types of laminated cores having different sheet thicknesses of the electrical steel sheet 40 were formed using the electrical steel sheet 40 having a sheet thickness of 0.20 mm and the electrical steel sheet 40 having a sheet thickness of 0.25 mm.

Example 2

As shown in FIG. 5, the adhesion parts 41 were provided on the outer circumferential side of the core back part 22 of the first surface 40a of the electrical steel sheet 40 and at least in the vicinity of the fastening parts 25 of the outer edge of the core back part 22. The plurality of electrical steel sheets 40 configured in this way were stacked to form the laminated core.

The ratio of an area of the adhesion regions 42 to 100% of an area of the core back part 22 of the first surface 40a of the electrical steel sheet 40 was 12%.

In other points, as in Example 1, two types of laminated cores having different sheet thicknesses of the electrical steel sheet 40 were formed.

Comparative Example

Figure 6:
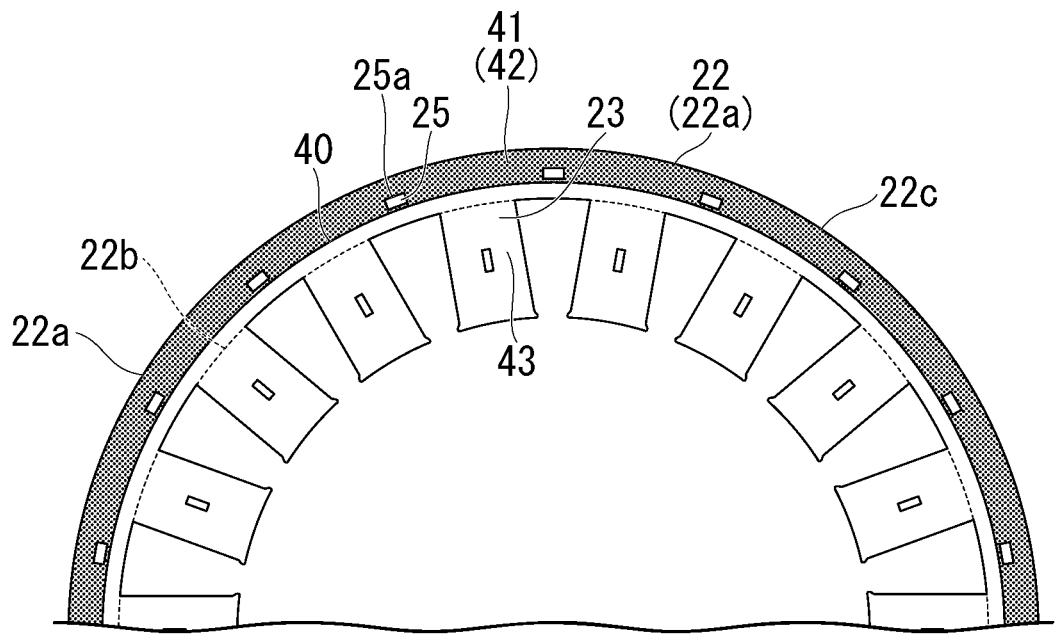
FIG. 6 is a plan view of a first surface of an electrical steel sheet in a laminated core according to a comparative example.

As shown in FIG. 6, the adhesion part 41 was provided over a region from a boundary 22c between the core back part 22 and the outer circumferential edge 22a of the first surface 40a of the electrical steel sheet 40 to the inner circumferential side of the core back part 22 of the first surface 40a of the electrical steel sheet 40. The plurality of electrical steel sheets 40 configured in this way were stacked to form the laminated core. The ratio of an area of the adhesion region 42 to 100% of an area of the core back part 22 of the first surface 40a of the electrical steel sheet 40 was 80%.

In other points, as in Example 1, two types of laminated cores having different sheet thicknesses of the electrical steel sheet 40 were manufactured.

[Evaluation of Iron Loss]

In the laminated cores produced in Examples 1 and 2 and the comparative example, an excitation current having an effective value of 10 A and a frequency of 100 Hz was applied to the winding of each phase. Then, the iron loss was evaluated under the condition that the rotation speed of the rotor was set to 1000 rpm.

The evaluation of the iron loss was executed by a simulation using software. As the software, electromagnetic field simulation software JMAG which is based on a finite element method and is manufactured by JSOL Corporation was used.

Figure 7:
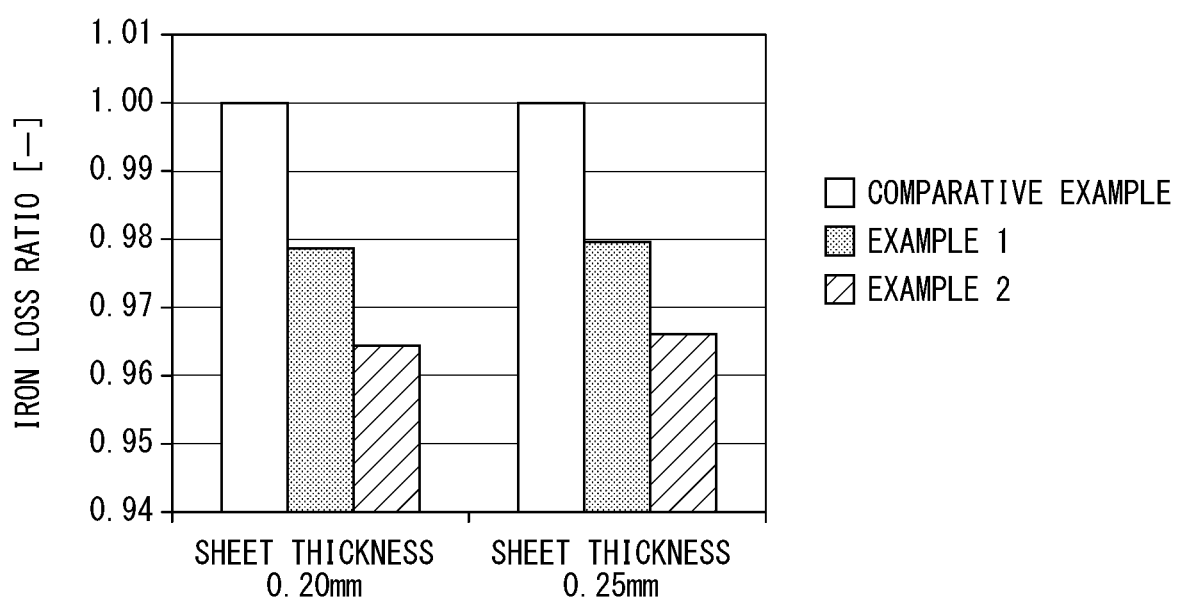
FIG. 7 is a diagram showing relative values of the iron losses of laminated cores of Example 1 and Example 2 in a case in which the iron loss of the laminated core of the comparative example is set to 1.

Relative values of the iron losses of laminated cores of Examples 1 and 2 with the iron loss of the laminated core of the comparative example set to 1 are shown in FIG. 7.

From the results of FIG. 7, it was found that the iron losses of the laminated cores of Examples 1 and 2 are lower than that of the laminated core of the comparative example regardless of the thickness of the electrical steel sheet 40.

Therefore, it was found that in the laminated cores of Examples 1 and 2, it is possible to reduce the loss generated in the laminated core by reducing the strain occurred in the entire laminated core. Further, it was found that in the laminated cores of Examples 1 and 2, it is possible to sufficiently secure the magnetic properties of the laminated core.

INDUSTRIAL APPLICABILITY

According to the present invention, it is possible to provide a laminated core having improved magnetic properties and an electric motor including the laminated core. Therefore, the industrial applicability is great.

BRIEF DESCRIPTION OF THE REFERENCE SYMBOLS

10 Electric motor
20 Stator
21 Stator core (laminated core)
22 Core back part
23 Tooth part
25 fastening part
27 Virtual circle
30 Rotor
31 Rotor core (laminated core)
32 Permanent magnet
33 Through hole
40 Electrical steel sheet
41 Adhesion part
42 Adhesion region
43 Non-adhesion region
50 Case
60 Rotary shaft

The invention claimed is:

1. A laminated core comprising a plurality of electrical steel sheets stacked in a thickness direction,
wherein each of the electrical steel sheets includes an annular core back part,
wherein a plurality of adhesion regions are formed on an outer circumferential side of the annular core back part,
wherein a non-adhesion region is formed on an inner circumferential side of the annular core back part,
wherein a plurality of fastening parts are provided in the non-adhesion region formed on a radial inside than the plurality of the adhesion regions of the annular core back part at intervals in a circumferential direction,
wherein the plurality of the adhesion regions are formed only in the vicinity of the fastening parts, and
wherein the plurality of the adhesion regions formed on the outer circumferential side of the annular core back part are disposed at intervals from each other in the circumferential direction.

2. The laminated core according to claim 1,
wherein the outer circumferential side of the annular core back part is an outside of outer circumferential edges of the fastening parts, and
wherein the inner circumferential side of the annular core back part is an inside of the outer circumferential edges of the fastening parts.

3. The laminated core according to claim 1,
wherein the outer circumferential side of the annular core back parts is an outside of a virtual circle formed on an outer circumferential side of the outer circumferential edges of the fastening parts, and
wherein the inner circumferential side of the annular core back part is an inside of the virtual circle.

4. The laminated core according to claim 1, further comprising an adhesion part which is provided in in the plurality of the adhesion regions of the annular core back part between the electrical steel sheets adjacent in the stacking direction and adheres the annular core back parts adjacent in the stacking direction to each other.

5. The laminated core according to claim 4, wherein an average thickness of the adhesion parts is 1.0 μm to 3.0 μm.

6. The laminated core according to claim 4, wherein an average tensile modulus of elasticity E of the adhesion parts is 1500 MPa to 4500 MPa.

7. The laminated core according to claim 4, wherein the adhesion part is a room temperature adhesion type acrylic-based adhesive including SGA made of an elastomer-containing acrylic-based adhesive.

8. An electric motor comprising the laminated core according to claim 1.

9. The laminated core according to claim 1,
wherein each electrical steel sheet includes a plurality of tooth parts that protrude from the annular core back part in a radial direction,
wherein the plurality of the non-adhesion regions are is formed in each of the tooth parts, and wherein each adhesion region is formed only in a position which is a radial outside of a portion between the plurality of tooth parts adjacent in the circumferential direction.

* * * * *